March 7, 1939.  J. D. CHAMBLESS  2,149,935
CANE STRIPPER
Filed July 9, 1937
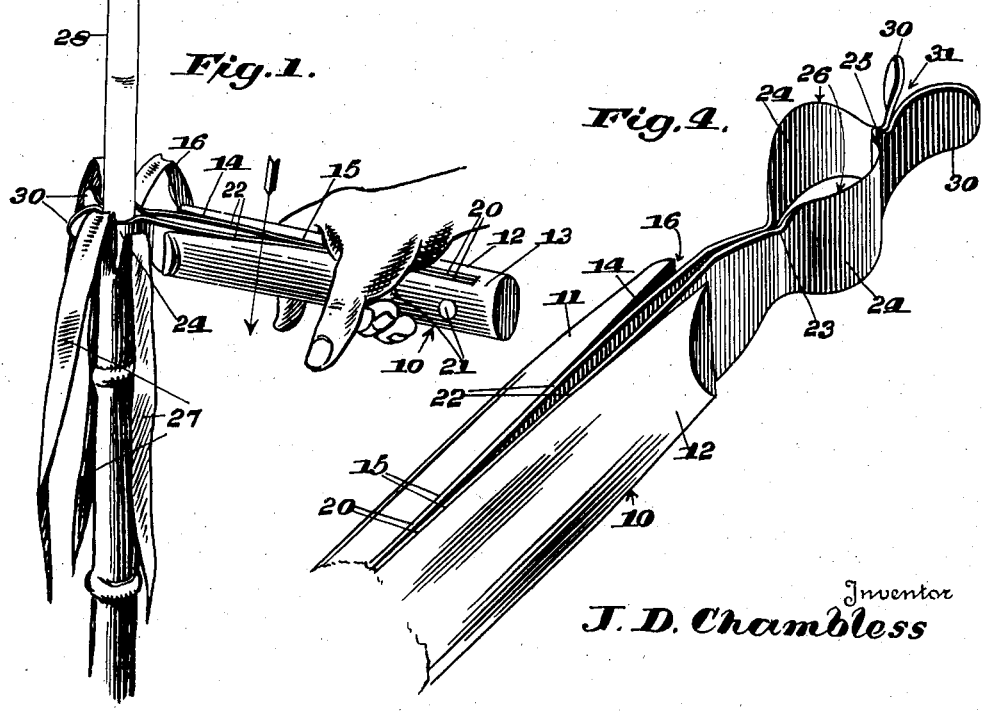

Patented Mar. 7, 1939

2,149,935

UNITED STATES PATENT OFFICE 2,149,935

CANE STRIPPER

James D. Chambless, Bronwood, Ga., assignor to Carolyn Chambless Lowrey, Dawson, Ga.

Application July 9, 1937, Serial No. 152,853

1 Claim. (Cl. 130—31)

This invention relates to cane strippers.

An object of the invention is the provision of a stripper having a pair of blades which are resiliently supported in a handle so that said blades may be spread apart for the application of the blades or cutters to a stalk after which the blades will resume a position in contact with the curved surface of the stalk so that when the stripper is moved downwardly over the stalk the leaves will be cut off where said leaves join the stalk.

Another object of the invention is the provision of a cane stripper having semi-circular blades or cutters with the opposite ends of one blade located in close association with the similarly positioned ends of the cooperating blade, with the blades being resiliently supported in the handle so that they may be readily spread apart and returned to their normal position after they have been released so that these blades will completely encompass the stalk for cutting off the leaves of the stalk when the blades or cutters are moved downwardly over the stalk, the outer ends of the blades having flared extensions to facilitate the application of the cutters to a stalk.

A further object of the invention is the provision of a cane stripper having a handle provided with a kerf in which is mounted a pair of resilient shanks which are movable outwardly from each other, the outer ends of the shanks projecting beyond the handle and being provided with curved cutters, the opposite ends of one cutter being closely associated with the adjacently disposed opposite ends of the other cutter, the outer ends of the blades having flared portions which will facilitate the application of the blades to the stalk when the flared portions are forced against the stalk.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a view in perspective of my cane stripper shown in operative position upon a stalk of cane, Figure 2 is a fragmentary plan view of the stripper in an inoperative position, Figure 3 is a similar view showing the act of forcing the tool on a cane, and Figure 4 is an inverted perspective view of the stripper.

Referring more particularly to the drawing, 10 generally designates a handle having two sections 11 and 12 spaced apart and joined together at their outer ends, as shown at 13. In other words the handle is in the form of a kerf having a longitudinal slot 14 which increases in width from the portion 15 to the outer end, shown at 16, for a purpose which will be presently explained.

A pair of shanks 20 are received in the longitudinal slot and are connected at spaced points to the handle by means of rivets 21. The outer ends of these shanks are in close contact up to the point indicated by the numeral 15 whence they are slightly spread apart and bowed outwardly from each other, as shown at 22. However, the shanks are spaced from the outer portions of the inner faces of the sections 11 and 12 of the handle for a purpose which will be presently explained. These shanks are brought into close association, as shown at 23.

A pair of blades or cutters 24 are curved outwardly from each other to form a substantially circular opening to receive a stalk of cane. The blades extend outwardly from the outer free ends of their respective shanks 20 and then are brought in close association, as shown at 25. One edge of each blade, as shown at 26, is curved and sharpened to provide a cutter for cutting off the leaves 27 of a stalk 28 of cane, as shown in Fig. 1.

Each blade is provided with an extension 30 which is curved or flared outwardly to provide a flared mouth 31 through which the cane is forced as shown in Fig. 3 to facilitate the reception of a stalk by the cutters.

The operation of my device is as follows: In order to apply the stripper to the stalk 28 it is only necessary to engage the stalk within the flared mouth 31 between the flared extensions 30 and when sufficient pressure is applied to the handle the spring shanks will be forced apart as will be the extensions 30 so that the stalk 28 will automatically fall in between the pair of cutters 24. The handle is then forced downwardly causing the cutters to move over the stalk and the leaves 27 will then be cut neatly from the stalk at a point where said leaves join the stalk so that at the completion of the stripping act the stalk will be completely bare.

It will be noted that by the bowing, as shown at 22, of the shanks that the cutters may be forced apart very readily until the shanks come in contact with the outwardly flared faces 16 of the kerf formed in the handle whence these shanks will be limited against further outward movement.

The shanks are formed of spring metal so that these shanks where they project beyond the inner end of the handle may be slightly bent outwardly where the diameter of the cane is slightly beyond the normal width.

The construction is such that the stripper will be able to engage stalks of various diameters for stripping the leaves because of the fact that the shanks are resilient and also because of the fact that the shanks are slightly bowed outwardly at 22 so that the variations in diameters will be compensated for by the spring members which always maintain the cutters in close association with the stripping operation.

I claim:

A cane stripper comprising a handle having an outwardly diverging kerf at one end, a pair of blades having shanks received by the kerf and secured to said handle at points adjacent the other end of said handle, said shanks being formed of spring metal and lying in contact at points with each other, the outer faces of the shanks being spaced from the kerf to permit said shanks to be moved outwardly from each other, a semi-circular cutter projecting from each shank, an outwardly flared extension projecting from each blade, the cutters being bowed outwardly from each other to receive a stalk, the flared extensions facilitating the application of the cutters to a stalk, a portion of each shank substantially within the kerf being bowed outwardly for maintaining the cutters in operative relation, the shanks being in contact at points just inwardly of the cutters.

JAMES D. CHAMBLESS.